(12) United States Patent
Ohara

(10) Patent No.: US 8,907,880 B2
(45) Date of Patent: Dec. 9, 2014

(54) LIQUID CRYSTAL DISPLAY DEVICE

(75) Inventor: Masanori Ohara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 345 days.

(21) Appl. No.: 13/394,545

(22) PCT Filed: Sep. 9, 2010

(86) PCT No.: PCT/JP2010/065510
§ 371 (c)(1),
(2), (4) Date: May 23, 2012

(87) PCT Pub. No.: WO2011/030819
PCT Pub. Date: Mar. 17, 2011

(65) Prior Publication Data
US 2012/0223921 A1 Sep. 6, 2012

(30) Foreign Application Priority Data

Sep. 10, 2009 (JP) ................. 2009-209697

(51) Int. Cl.
*G09G 3/36* (2006.01)
*G02F 1/1362* (2006.01)

(52) U.S. Cl.
CPC ............ *G09G 3/3651* (2013.01); *G02F 1/1362* (2013.01); *G09G 2300/0823* (2013.01); *G09G 2300/0447* (2013.01); *G09G 3/3688* (2013.01); *G09G 2310/0224* (2013.01); *G09G 2300/0443* (2013.01)
USPC ............................. 345/90; 345/87

(58) Field of Classification Search
CPC ..... G09G 3/36; G09G 3/3611; G09G 3/3644; G09G 3/3651; G09G 3/3666; G09G 2300/0439; G02F 1/1362
USPC ........................ 345/55, 87, 90, 204; 349/129
See application file for complete search history.

(56) References Cited

U.S. PATENT DOCUMENTS

2005/0122441 A1    6/2005  Shimoshikiryoh
2006/0164352 A1    7/2006  Yoo et al.
(Continued)

FOREIGN PATENT DOCUMENTS

CN    101369083 A    2/2009
JP    2000-241797 A    9/2000
(Continued)

OTHER PUBLICATIONS

International Preliminary Report on Patentability received for PCT Patent Application No. PCT/JP2010/065510, mailed on Apr. 19, 2012, 6 pages.

(Continued)

*Primary Examiner* — Joe H Cheng
(74) *Attorney, Agent, or Firm* — Morrison & Foerster LLP

(57) ABSTRACT

A liquid crystal display device (100) according to the present invention includes: first and second pixel transistors (130a, 130b); a gate driver (210) that supplies a gate signal to a gate line (G); a source driver (220) that supplies a source signal to first and second branch lines (225a and 225b); a first source transistor (180a), which includes a source that is electrically connected to the first branch line (225a) and a drain that is electrically connected to a first source line (Sa); and a second source transistor (180b), which includes a source that is electrically connected to the second branch line (225b) and a drain that is electrically connected to a second source line (Sb).

6 Claims, 7 Drawing Sheets

(56) References Cited

U.S. PATENT DOCUMENTS

| | | |
|---|---|---|
| 2006/0208984 A1 | 9/2006 | Kim et al. |
| 2007/0008263 A1 | 1/2007 | Kim |
| 2008/0024406 A1* | 1/2008 | Kim et al. ............. 345/87 |
| 2008/0225212 A1 | 9/2008 | Ong |
| 2008/0284680 A1 | 11/2008 | Chen et al. |
| 2010/0201903 A1* | 8/2010 | Huang et al. ............. 349/55 |
| 2010/0265424 A1* | 10/2010 | Chiu et al. ............. 349/54 |

FOREIGN PATENT DOCUMENTS

| | | |
|---|---|---|
| JP | 2005-189804 A | 7/2005 |
| JP | 2006-139288 A | 6/2006 |
| JP | 2006-209135 A | 8/2006 |
| JP | 2006-309239 A | 11/2006 |
| JP | 2009-53589 A | 3/2009 |

OTHER PUBLICATIONS

International Search Report received for PCT Patent Application No. PCT/JP2010/065510, mailed on Nov. 2, 2010, 3 pages (1 page of English translation and 2 pages of PCT Search Report).

Extended European Search Report and Search Opinion received for EP Patent Application No. 10815414.7, mailed on May 2, 2013, 7 pages.

* cited by examiner

LIQUID CRYSTAL DISPLAY DEVICE

CROSS REFERENCE TO RELATED APPLICATIONS

This is a U.S. National Phase patent application of PCT/JP2010/065510, filed Sep. 9, 2010, which claims priority to Japanese Patent Application No. 2009-209697, filed Sep. 10, 2009, each of which is hereby incorporated by reference in the present disclosure in its entirety.

TECHNICAL FIELD

The present invention relates to a liquid crystal display device and more particularly relates to a liquid crystal display device with a multi-pixel structure.

BACKGROUND ART

Liquid crystal displays (LCDs) have been used in not only TV sets with a big screen but also small display devices such as the monitor screen of a cellphone. TN (twisted nematic) mode LCDs, which would often be used in the past, achieved relatively narrow viewing angles, but LCDs of various other modes with wider viewing angles have recently been developed one after another. Examples of those wider viewing angle modes include IPS (in-plane switching) mode and VA (vertical alignment) mode. Among those wide viewing angle modes, the VA mode is adopted in a lot of LCDs because the VA mode would achieve a sufficiently high contrast ratio.

Known as a kind of VA mode LCD is an MVA (multi-domain vertical alignment) mode LCD in which multiple liquid crystal domains are defined within a single pixel region. In an MVA mode LCD, an alignment control structure is provided for at least one of the two substrates, which face each other with a vertical alignment liquid crystal layer interposed between them, so that the alignment control structure faces the liquid crystal layer. As the alignment control structure, a linear slit (opening) or a rib (projection) of an electrode may be used, thereby applying alignment controlling force to the liquid crystal layer from one or both sides thereof. In this manner, multiple (typically four) liquid crystal domains with multiple different alignment directions are defined, thereby attempting to improve the viewing angle characteristic.

Also known as another kind of VA mode LCD is a CPA (continuous pinwheel alignment) mode LCD. In a normal CPA mode LCD, its pixel electrodes have a highly symmetric shape and either an opening or a projection (which is sometimes called a "rivet") is arranged on the surface of the counter substrate which faces the liquid crystal layer so as to be aligned with the center of a liquid crystal domain. When a voltage is applied, an oblique electric field is generated by the counter electrode and the highly symmetric pixel electrode and induces radially tilting alignments of liquid crystal molecules. Also, with a rivet provided, the alignment controlling force by the slope of the rivet stabilizes the tilting alignments of the liquid crystal molecules. As the liquid crystal molecules are radially aligned within a single pixel in this manner, the viewing angle characteristic can be improved.

It is known that the display quality achieved by a VA mode LCD when the viewer is located right in front of the screen (which will be referred to herein as "when viewed straight on") is significantly different from the one achieved when the viewer is located obliquely with respect to the screen (which will be referred to herein as "when viewed obliquely"), which is a problem with the VA mode LCD. Particularly when a grayscale tone is displayed, if adjustments are made so as to optimize the display performance when viewed straight on, then the display performance (including the hue and the gamma characteristic) achieved when viewed obliquely will be quite different from the one achieved when viewed straight on. The optic axis direction of a liquid crystal molecule is the major axis direction of that molecule. When a grayscale tone is displayed, the optic axis direction of a liquid crystal molecule is somewhat tilted with respect to the principal surface of the substrate. And if the viewing angle (or viewing direction) is changed in such a state so as to view the screen obliquely and parallel to the optic axis direction of the liquid crystal molecules, the resultant display performance will be totally different from the one achieved when viewed straight on.

Specifically, when viewed obliquely, the displayed image will look more whitish as a whole than when viewed straight on, which is called a "whitening" phenomenon. For example, if a person's face is displayed, the viewer will find that person's facial expressions displayed quite natural when viewing right in front of the screen. However, when viewing obliquely, he or she will sense that person's face look unnaturally white overall. In that case, subtle tones of the person's skin color may be lost and an overall whitish face may be displayed instead.

To minimize such a whitening phenomenon, multiple (typically two) subpixels may be formed by splitting a single pixel electrode into multiple (typically two) subpixel electrodes and applying two different voltages to those subpixel electrodes. In an LCD with such a multi-pixel structure, the grayscale characteristic of each subpixel is controlled so as to prevent the display performance from deteriorating even when viewed obliquely from what is achieved when viewed straight on (see Patent Documents Nos. 1 to 3, for example).

Specifically, in the LCD disclosed in Patent Document No. 1, the two subpixel electrodes are connected to mutually different source lines by way of two different thin-film transistors and a source driver applies mutually different source signal voltages to respective pixels. In that case, since the two subpixel electrodes will have different voltages applied, those subpixels will have respectively different luminances. Consequently, the whitening phenomenon can be less perceptible.

On the other hand, in the LCD disclosed in Patent Document No. 2, two different thin-film transistors associated with the two subpixel electrodes are connected to mutually different gate lines, and a gate driver applies different gate signal voltages to respective pixels so that the thin-film transistors will have mutually different ON-state periods. In that case, since the two subpixel electrodes will have different voltages applied, those subpixels will have respectively different luminances. Consequently, the whitening phenomenon can also be less perceptible.

With the LCD of Patent Document No. 1 adopted, however, the source driver should apply mutually different source signal voltages from two source output terminals to a single column of pixels. That is why a rather expensive source driver should be used in that case. The same goes for the LCD of Patent Document No. 2. That is to say, even if the LCD of Patent Document No. 2 is adopted, the gate driver should apply mutually different gate signal voltages from two gate output terminals to a single row of pixels, and therefore, a rather expensive gate driver should be used.

Meanwhile, Patent Document No. 3 discloses an LCD in which by making the voltages applied to adjacent storage capacitor lines (CS lines) vary to be different from each other, mutually different effective voltages are applied to subpixels. In the LCD of Patent Document No. 3, the source driver applies a source signal voltage from a single source output terminal to each column of pixels, and the gate driver applies a gate signal voltage from a single gate output terminal to each row of pixels. That is why the LCD of Patent Document No. 3 can cut down the driver cost.

Hereinafter, the configuration of the LCD 900 disclosed in Patent Document No. 3 will be described with reference to FIG. 10. In the LCD 900, by applying mutually different CS voltages to multiple CS lines, each of which forms, along with its associated subpixel electrode, a storage capacitor either directly or indirectly, the subpixel electrodes will have different effective voltages applied. As a result, subpixels belonging to a single pixel can exhibit multiple different luminances. The LCD 900 makes the whitening phenomenon less perceptible in this manner.

Also, in the LCD 900, a number of CS trunk lines CST are arranged in the peripheral area, which surrounds the display area, and multiple CS lines extend from each of those CS trunk lines to the display area. In the LCD 900, by applying equivalent storage capacitor voltages (CS voltages) to multiple CS lines that extend from the same CS trunk line, the processing load imposed on a CS voltage generator (not shown) can be reduced.

For example, the LCD 900 shown in FIG. 10 is provided with twelve CS trunk lines CST1 through CST12, and multiple different CS voltages, generated by the CS voltage generator, are supplied through those CS trunk lines CST1 through CST12 to the CS lines. In such an LCD, the larger the number of CS trunk lines provided, the longer the inversion period of the CS voltage applied to each of those CS trunk lines. If the CS voltage had an ideal rectangular waveform, then the display operation could be carried out with only two CS trunk lines without making the luminances uneven. Even so, the bigger the size of the LCD, the blunter the waveform of the CS voltage will get, thus making it impossible to carry out a display operation without making the luminances uneven after all. That is why by increasing the number of CS trunk lines to provide, the ratio of the CS voltage inversion period to one horizontal scanning period can be increased. As a result, the display operation can be carried out with the unevenness in luminance reduced significantly.

CITATION LIST

Patent Literature

Patent Document No. 1: Japanese Laid-Open Patent Publication No. 2006-209135
Patent Document No. 2: Japanese Laid-Open Patent Publication No. 2006-139288
Patent Document No. 3: Japanese Laid-Open Patent Publication No. 2005-189804

SUMMARY OF INVENTION

Technical Problem

The LCD of Patent Document No. 3, however, provides those CS trunk lines in the peripheral area, and therefore, the planar area of its frame area cannot be reduced sufficiently.

It is therefore an object of the present invention to provide a liquid crystal display device that can not only minimize an increase in driver cost but also reduce the planar-area of the frame area sufficiently.

Solution to Problem

A liquid crystal display device according to the present invention includes: a pixel electrode, which includes first and second subpixel electrodes; a counter electrode; a liquid crystal layer, which is interposed between the pixel electrode and the counter electrode; a gate line; a first source line; a second source line; a first pixel transistor, which includes a gate that is electrically connected to the gate line, a source that is electrically connected to the first source line, and a drain that is electrically connected to the first subpixel electrode; a second pixel transistor, which includes a gate that is electrically connected to the gate line, a source that is electrically connected to the second source line, and a drain that is electrically connected to the second subpixel electrode; a gate driver, which supplies a gate signal to the gate line; a first branch line; a second branch line; a source driver, which supplies a source signal to the first and second branch lines; a first source transistor, which includes a gate, a source that is electrically connected to the first branch line, and a drain that is electrically connected to the first source line; and a second source transistor, which includes a gate, a source that is electrically connected to the second branch line, and a drain that is electrically connected to the second source line. In the liquid crystal display device of the present invention, the first and second source transistors can make the voltage on the first source line different from the one on the second source line when the first and second pixel transistors are in OFF state.

In one embodiment, the liquid crystal display device further includes a connector line that electrically connects the first and second branch lines to the source driver.

In one embodiment, the second source transistor has a different threshold voltage from the first source transistor.

In one embodiment, the gate of the first source transistor is electrically connected to its own source, and the gate of the second source transistor is electrically connected to its own source.

In one embodiment, the liquid crystal display device further includes a transistor controller that controls the first and second source transistors.

In one embodiment, the transistor controller controls the first and second source transistors so that the ON-state periods of the first and second source transistors are different from each other.

In one embodiment, while the gate driver keeps the first and second pixel transistors ON, the source driver changes the levels of the voltage applied to the first and second branch lines from a first voltage into a second voltage. While the source driver is applying the first voltage, the transistor controller turns the first source transistor ON. And while the source driver is applying the second voltage, the transistor controller turns the second source transistor ON.

Advantageous Effects of Invention

The present invention provides a liquid crystal display device that can not only minimize an increase in driver cost but also reduce the planar-area of the frame area sufficiently.

DESCRIPTION OF EMBODIMENTS

Hereinafter, embodiments of a liquid crystal display device according to the present invention will be described with reference to the accompanying drawings. It should be noted, however, that the present invention is in no way limited to the specific embodiments to be described below.

Embodiment 1

Figure 1:
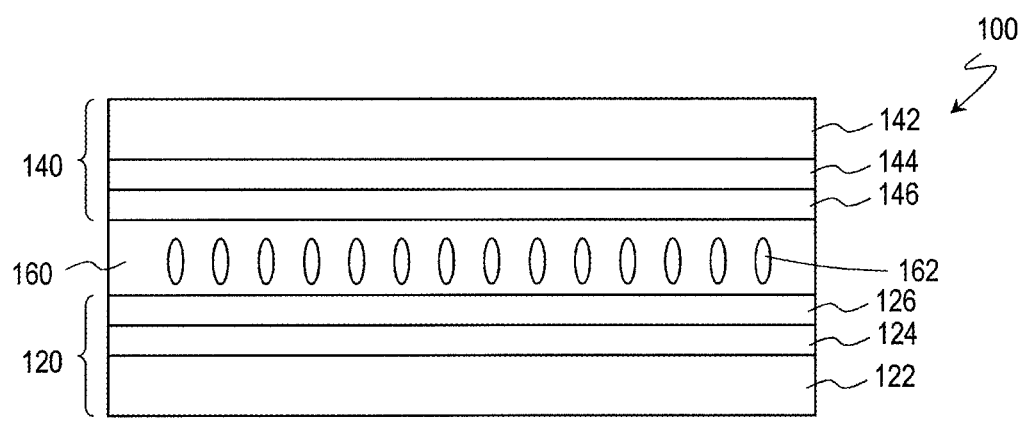
FIG. 1 is a schematic representation illustrating a liquid crystal display device as a first embodiment of the present invention.

FIG. 1 is a schematic representation illustrating a liquid crystal display device 100 as a first embodiment of the present invention. The liquid crystal display device 100 includes an active-matrix substrate 120 with pixel electrodes 124 and an alignment film 126 that have been stacked in this order on an insulating substrate 122, a counter substrate 140 with a counter electrode 144 and another alignment film 146 that have also been stacked in this order on another insulating substrate 142, and a liquid crystal layer 160, which is interposed between the active-matrix substrate 120 and the counter substrate 140. Although not shown, two polarizers are provided for the active-matrix substrate 120 and the counter substrate 140, respectively, and are arranged so that their polarization axes satisfy the crossed Nicols relation. The liquid crystal layer 160 has a substantially uniform thickness. If necessary, the liquid crystal display device 100 may include a backlight.

In this liquid crystal display device 100, a number of pixels are arranged in columns and rows so as to form a matrix pattern. For example, in a liquid crystal display device that conducts a color display operation using R (red), G (green) and B (blue) as the three primary colors, one color is represented by a set of R, G and B pixels. Each pixel is defined by an associated one of the pixel electrodes 124. The counter electrode 144 is a single electrode that is provided in common for those pixel electrodes 124. The counter electrode 144 may include a transparent conductor film, which may be made of ITO, for example. Likewise, the pixel electrodes 124 may also include a transparent conductor film, which may be made of ITO, for example.

This liquid crystal display device 100 operates in the VA mode. Thus, the alignment films 126 and 146 are vertical alignment films and the liquid crystal layer 160 is a vertical alignment liquid crystal layer. In this description, the "vertical alignment liquid crystal layer" refers to a liquid crystal layer in which the axis of its liquid crystal molecules (which will be sometimes referred to herein as an "axial direction") defines an angle of approximately 85 degrees or more with respect to the surface of the vertical alignment films 126 and 146. The liquid crystal molecules 162 have negative dielectric anisotropy. Using such liquid crystal molecules along with two polarizers that are arranged as crossed Nicols, this device conducts a display operation in a normally black mode. Specifically, in that mode, when no voltage is applied across the liquid crystal layer 160, the liquid crystal molecules 162 in the liquid crystal layer 160 are aligned substantially parallel to a normal to the principal surface of the alignment films 126 and 146. On the other hand, when a voltage that is higher than a predetermined voltage is applied across the liquid crystal layer 160, the liquid crystal molecules 162 in the liquid crystal layer 160 are aligned substantially parallel to the principal surface of the alignment films 126 and 146. In this example, each of the active-matrix substrate 120 and the counter substrate 140 has its own alignment film 126, 146. However, according to the present invention, at least one of the active-matrix substrate 120 and the counter substrate 140 needs to have an alignment film 126 or 146. Nevertheless, in order to stabilize the alignments, it is still preferred that both of the active-matrix substrate 120 and the counter substrate 140 have their own alignment film 126, 146.

Figure 2:
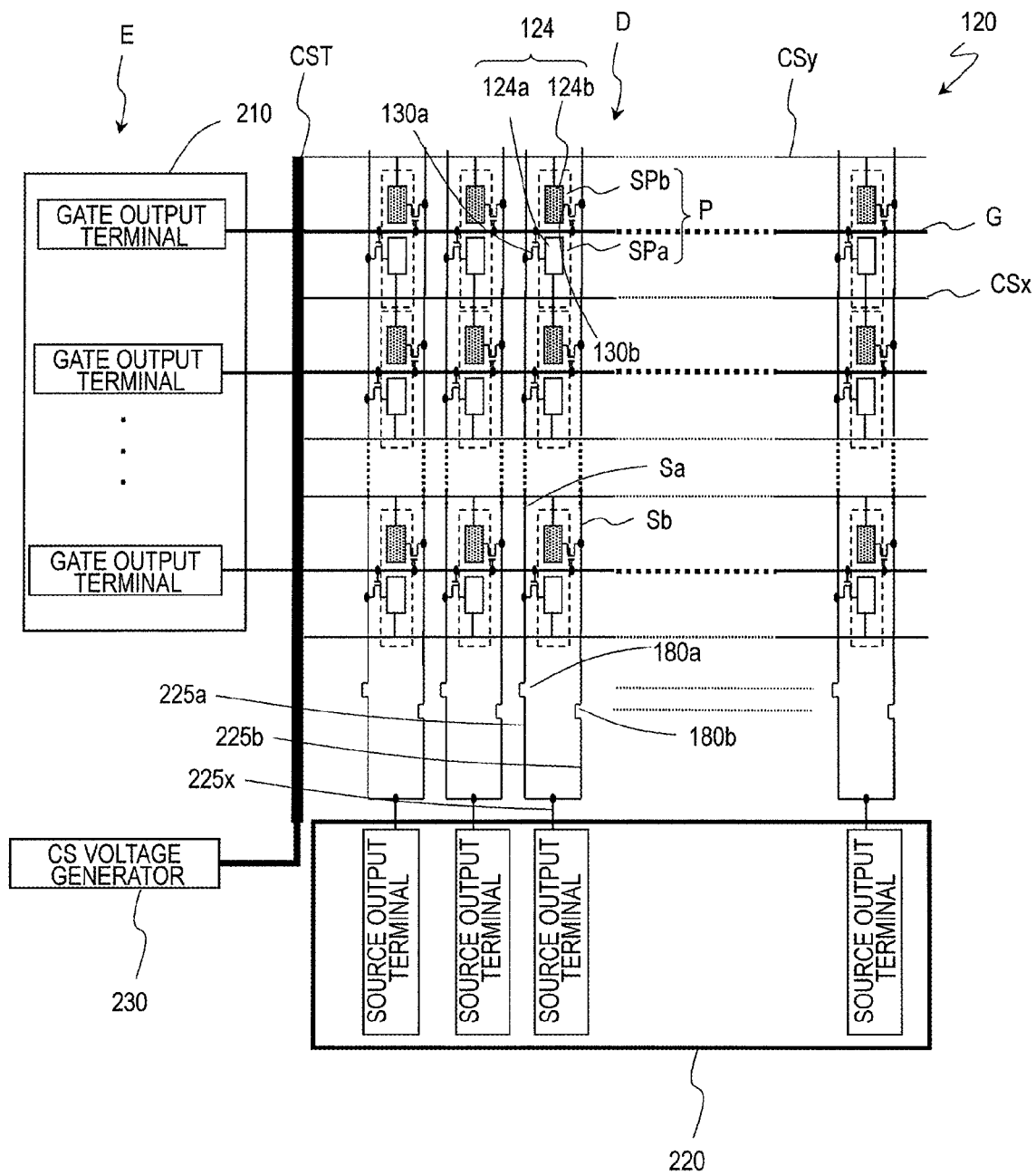
FIG. 2 is a plan view schematically illustrating the active-matrix substrate of the liquid crystal display device shown in FIG. 1.

FIG. 2 is a plan view schematically illustrating the active-matrix substrate 120 of the liquid crystal display device 100. In its display area D, a number of pixels P are arranged in columns and rows so as to form a matrix pattern.

Each of those pixels P includes two subpixels SPa and SPb that can exhibit mutually different luminances, and is defined by an associated one of the pixel electrodes 124. Each pixel electrode 124 includes two subpixel electrodes 124a and 124b. In the following description, the subpixel electrodes 124a and 124b will sometimes be referred to herein as a "first subpixel electrode" and a "second subpixel electrode", respectively. The subpixels SPa and SPb are defined by the first and second subpixel electrodes 124a and 124b, respectively.

In the liquid crystal display device 100, one gate line G is provided for a single row of pixels P and two source lines Sa and Sb are provided for a single column of pixels P. In the following description, the configuration of this liquid crystal display device 100 will be described with attention paid to a pixel P that is located at a row m, column n position. One gate line G and two source lines Sa and Sb are provided for the subpixels SPa and SPb belonging to that pixel P.

A transistor 130a is provided as a switching element for the subpixel SPa, and a transistor 130b is provided as a switching element for the subpixel SPb. Specifically, the transistor 130a includes a gate that is electrically connected to the gate line G, a source that is electrically connected to the source line Sa, and a drain that is electrically connected to the first subpixel electrode 124a. Likewise, the transistor 130b includes a gate that is electrically connected to the gate line G, a source that is electrically connected to the source line Sb, and a drain that is electrically connected to the second subpixel electrode 124b. In the following description, such a transistor arranged in the display area will sometimes be referred to herein as a "pixel transistor". Specifically, these transistors 130a and 130b will sometimes be referred to herein as a "first pixel transistor" and a "second pixel transistor", respectively. Thin-film transistors (TFTs) may be used as the first and second transistors 130a and 130b.

In the peripheral area E of the liquid crystal display device 100, arranged is a gate driver 210, which includes almost as many gate output terminals as the rows of pixels P. Each gate output terminal is electrically connected to its associated gate line G. The gate driver 210 supplies a gate signal to the respective gates of the TFTs 130a and 130b through the gate line G, thereby controlling the TFTs 130a and 130b.

In the peripheral area E of the liquid crystal display device 100, also arranged is a source driver 220, which includes almost as many source output terminals as the columns of pixels. Each source output terminal is electrically connected to its associated connector line 225x. Two branch lines 225a and 225b are extended from each connector line 225x.

In this liquid crystal display device 100, a transistor 180a is arranged between the branch line 225a and the source line Sa, and a transistor 180b is arranged between the branch line 225b and the source line Sb. The transistor 180a includes a gate, a source that is electrically connected to the branch line 225a, and a drain that is electrically connected to the first source line Sa. Likewise, the transistor 180b includes a gate, a source that is electrically connected to the branch line 225b, and a drain that is electrically connected to the second source line Sb. TFTs may be used as the transistors 180a and 180b, which may be fabricated by performing the same series of manufacturing processing steps as the TFTs 130a and 130b.

The source signal is output from the source driver 220 to the branch lines 225a and 225b through the connector line 225x. In the liquid crystal display device 100 of this embodiment, the TFTs 180a and 180b set mutually different voltages on the source lines Sa and Sb when the first and second pixel transistors 130a and 130b turn OFF. That is why the voltage applied to the subpixel electrode 124a becomes different from the one applied to the subpixel electrode 124b, and therefore, the subpixels SPa and SPb exhibit mutually different luminances. In the following description, the TFTs 180a and 180b will sometimes be referred to herein as a "first source transistor" and a "second source transistor", respectively.

It should be noted that the connector line 225x, the branch lines 225a and 225b and the first and second source transistors 180a and 180b are all located in the peripheral area E. Also, the connector line 225x, the branch lines 225a and 225b, and the first and second source lines Sa and Sb will sometimes be collectively referred to herein as a "source bus line S". The source driver 220 supplies a source signal to the source bus line S.

In the liquid crystal display device 100, further arranged are CS lines CSx and CSy, each of which forms, along with its associated subpixel electrode 124a or 124b, a storage capacitor either directly or indirectly. These CS lines CSx and CSy are connected to the same CS trunk line CST and are supplied with equivalent CS voltages. A CS voltage generator 230 that generates a CS voltage is arranged in the peripheral area E. The CS voltage may be equivalent to the voltage of the counter electrode 144. Or the CS voltage that has been generated by the CS voltage generator 230 may be applied to the counter electrode 144 of the counter substrate 140.

Figure 3:
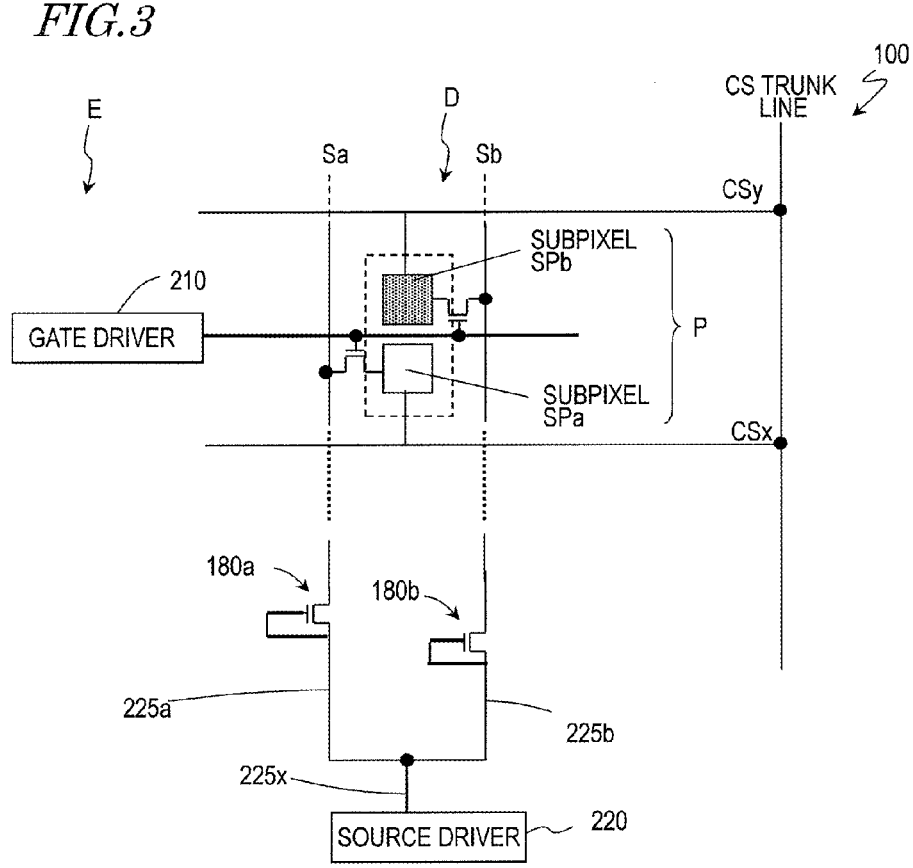
FIG. 3 is a plan view schematically illustrating the liquid crystal display device shown in FIG. 1.

FIG. 3 is a plan view schematically illustrating the liquid crystal display device 100. Although a number of pixels P are actually arranged in the display area D, only one of those pixels P is illustrated in FIG. 3. Also, the illustration of the CS voltage generator 230 shown in FIG. 2 is omitted in FIG. 3.

In the liquid crystal display device 100, the TFT 180b has a different characteristic from the TFT 180a. Specifically, the TFT 180b has a different threshold voltage from the TFT 180a. For example, the threshold voltage of the TFT 180b may be higher than that of the TFT 180a. Furthermore, in the liquid crystal display device 100, the gate of the TFT 180a is electrically connected to its own source, and the gate of the TFT 180b is electrically connected to its own source. In this manner, the TFTs 180a and 180b are diode connected.

Figure 4:
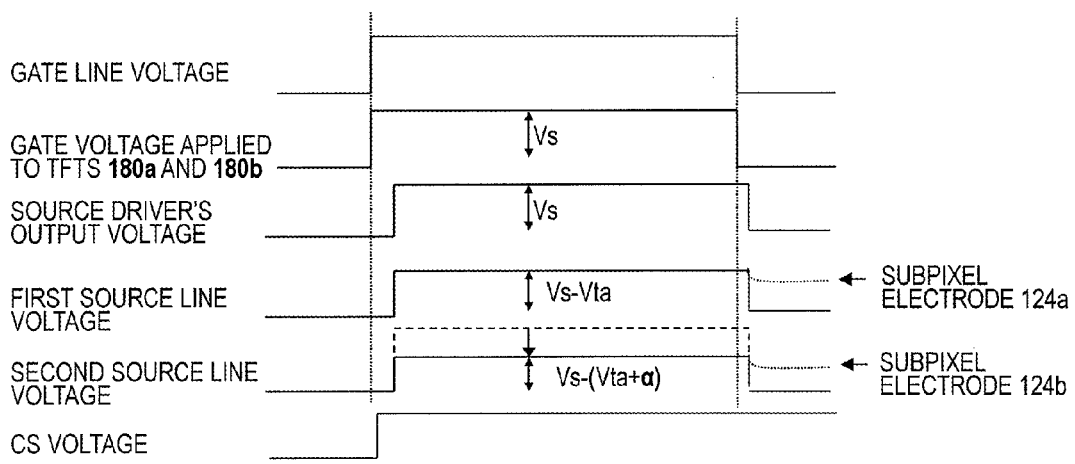
FIG. 4 shows the respective waveforms of the voltages applied in the liquid crystal display device shown in FIG. 1.

Hereinafter, it will be described with reference to FIGS. 3 and 4 how to drive the liquid crystal display device 100. In the following example, it will be described how a write operation may be performed on a pixel P. FIG. 4 shows the respective waveforms of the voltage applied to the gate line G, the voltages applied to the respective gates of the TFTs 180a and 180b, the output voltage of the source driver, the voltages on the first and second source lines Sa and Sb, and the CS voltage in the liquid crystal display device 100.

First of all, in order to select a pixel P, the voltage on the gate line G is raised from the low level to the high level, thereby turning the TFTs 130a and 130b ON. After that, the voltages on the CS trunk line CST and the counter electrode 144 that are electrically connected together are changed.

Next, a voltage Vs corresponding to a predetermined gray-scale level is applied from the source driver 220 to the source bus line S that is associated with that pixel P. The voltage Vs is transmitted through the connector line 225x and the branch lines 225a and 225b. That is why a voltage that is almost as high as the one applied to the gate of the TFT 180b is applied to the gate of the TFT 180a. It should be noted that in this liquid crystal display device 100, the voltage Vs supplied from the source driver 220 with respect to an arbitrary gray-scale level is greater than the threshold voltage of the TFTs 180a and 180b. As a result, the TFTs 180a and 180b are turned ON and the source driver 220 gets electrically connected to the source lines Sa and Sb by way of the connector line 225x and the branch lines 225a and 225b.

In the liquid crystal display device 100, the TFTs 180a and 180b have mutually different threshold voltages as described above. Thus, even if the voltages on the branch lines 225a and 225b are the same, the voltages on the source lines Sa and Sb may be different from each other. The voltage decrease caused by the TFT 180a is substantially equal to the threshold voltage Vta of the TFT 180a, and therefore, a voltage Vs-Vta is applied to the source line Sa. Likewise, the voltage decrease caused by the TFT 180b is substantially equal to the threshold voltage Vtb of the TFT 180b, and therefore, a voltage Vs-Vtb is applied to the source line Sb.

For example, if the threshold voltage Vtb is greater than the threshold voltage Vta (i.e., if Vtb=Vta+$\alpha$ (where $\alpha$>0)), the voltage applied to the source line Sb is lower than the one applied to the source line Sa. As a result, the voltage of the subpixel electrode 124b becomes lower than the one at the subpixel electrode 124a. Actually, however, it takes a predetermined amount of time to get the liquid crystal capacitors and storage capacitors of the subpixels SPa and SPb charged fully. And the voltages on the source lines Sa and Sb gradually change with time toward constant voltages Vs-Vta and Vs-Vtb after the voltage of the source driver 220 has changed. In FIG. 4, however, the voltages on the source lines Sa and Sb are supposed to change when the voltage of the source driver 220 changes, in order to avoid complicating the illustration too much. In this manner, as the voltages on the source lines Sa and Sb are different, the voltages applied to the subpixel electrodes 124a and 124b are also different from each other.

Next, the voltage on the gate line G falls from the high level to the low level. After that, the voltage of the source driver 220 changes. At this point in time, a feedthrough voltage, which has been generated due to the presence of a parasitic capacitance, causes the voltages of the subpixel electrodes 124a and 124b to fall. In FIG. 4, the voltages of the subpixel electrodes 124a and 124b, which have fallen due to the feedthrough voltage, are indicated by the dotted line. Nevertheless, even after the voltages have fallen due to the feedthrough voltage, the voltage of the subpixel electrode 124b is still lower than the one at the subpixel electrode 124a. In this manner, since the voltages of the subpixel electrodes 124a and 124b are different from each other, the luminances of the subpixels SPa and SPb can also be different from each other.

For example, if the voltages of the subpixel electrodes 124a and 124b are lower than the one at the counter electrode 144, the voltage difference between the subpixel electrode 124a and the counter electrode 144 (i.e., the effective voltage applied across a portion of the liquid crystal layer 160 that is allocated to the subpixel SPa) is smaller than the voltage difference between the subpixel electrode 124b and the counter electrode 144 (i.e., the effective voltage applied across a portion of the liquid crystal layer 160 that is allocated to the subpixel SPb). Consequently, the subpixel SPa becomes a dark subpixel and the subpixel SPb becomes a bright subpixel.

Or if the voltages of the subpixel electrodes 124a and 124b are higher than the one at the counter electrode 144, the voltage difference between the subpixel electrode 124a and the counter electrode 144 (i.e., the effective voltage applied across a portion of the liquid crystal layer 160 that is allocated to the subpixel SPa) is larger than the voltage difference between the subpixel electrode 124b and the counter electrode 144 (i.e., the effective voltage applied across a portion of the liquid crystal layer 160 that is allocated to the subpixel SPb). Consequently, the subpixel SPa becomes a bright subpixel and the subpixel SPb becomes a dark subpixel this time.

As described above, in the liquid crystal display device 100 of this embodiment, a source signal is output from the source driver 220 to the branch lines 225a and 225b by way of the connector line 225x, but the TFTs 180a and 180b with mutually different threshold voltages Vta and Vtb apply a different voltage to the source line Sb from the one applied to the source line Sa. As a result, the voltage of the subpixel electrode 124b becomes different from the one at the subpixel electrode 124a and the subpixel SPb comes to exhibit a different luminance from the subpixel SPa. In this manner, this liquid crystal display device 100 carries out a multi-pixel drive. Also, in this liquid crystal display device 100, as an equivalent CS voltage may be applied to the respective CS lines, there is no need to provide multiple CS trunk lines, and therefore, the planar area of the peripheral area E can be reduced. Furthermore, in this liquid crystal display device 100, the gate driver 210 may provide only one gate output terminal for each row of pixels and the source driver 220 may provide only one source output terminal for each column of pixels. Consequently, relatively inexpensive drivers can be used as the gate driver 210 and the source driver 220.

In the embodiment described above, the TFTs 180a and 180b are supposed to have mutually different threshold voltages. However, the TFTs 130a and 130b may have substantially equal threshold voltages. If the threshold voltage of the TFTs 130a and 130b is higher than that of the TFTs 180a and 180b, a gate voltage that is higher than the threshold voltage of the TFTs 180a and 180b is applied to the gate line G when the TFTs 130a and 130b are turned ON.

Also, if the input video signal indicates that every pixel should have the same grayscale level, then the brightness levels of any two subpixels that are adjacent to each other in either the row direction or the column direction invert in this liquid crystal display device 100. Furthermore, if the magnitude of the voltage applied to the pixel electrode 124 is greater than that of the voltage applied to the counter electrode 144 in one of any pair of pixels that are adjacent to each other in the row direction or the column direction, then the former voltage becomes smaller than the latter voltage in the other pixel.

For example, if in a pixel P that is located at a row m, column n position, the voltages of the subpixel electrodes 124a and 124b are +6 V and +4V, respectively, with respect to the voltage of the counter electrode 144, the effective voltages applied to the subpixels SPa and SPb are 6 V and 4 V and the subpixels SPa and SPb become a bright subpixel and a dark subpixel, respectively. On the other hand, if in an adjacent pixel P that is located at either a row m+1, column n position or a row m, column n+1 position, the voltages of the subpixel electrodes 124a and 124b are −4 V and −6 V, respectively, with respect to the voltage of the counter electrode 144, the effective voltages applied to the subpixels SPa and SPb are 4 V and 6 V, and the subpixels SPa and SPb become a dark subpixel and a bright subpixel, respectively.

Also, in a situation where the input video signal indicates that a pixel should maintain the same grayscale level all through a number of vertical scanning periods that are defined by the liquid crystal display device 100, if the voltages of the subpixel electrodes 124a and 124b of a pixel P are greater than the voltage of the counter electrode 144 in one vertical scanning period, then the former voltages may be smaller than the latter voltage in the next vertical scanning period. For example, if the polarity of a voltage to be written is called "positive" when the voltages of the subpixel electrodes 124a and 124b are higher than the voltage of the counter electrode 144 and called "negative" when the voltages of the subpixel electrodes 124a and 124b are lower than the voltage of the counter electrode 144, then one vertical scanning period in which a positive voltage has been written is followed by another vertical scanning period in which a negative voltage is written.

For example, if the voltages of the subpixel electrodes 124a and 124b are +6 V and +4V, respectively, with respect to the voltage of the counter electrode 144, the effective voltages applied to the subpixels SPa and SPb are 6 V and 4 V and the subpixels SPa and SPb become a bright subpixel and a dark subpixel, respectively. On the other hand, if in another (typically, the next) vertical scanning period, the voltages of the subpixel electrodes 124a and 124b are −4 V and −6 V, respectively, with respect to the voltage of the counter electrode 144, the effective voltages applied to the subpixels SPa and SPb are 4 V and 6 V, and the subpixels SPa and SPb become a dark subpixel and a bright subpixel, respectively. In this manner, in the liquid crystal display device 100, the polarity and the brightness levels of the subpixels can be inverted every vertical scanning period (or frame).

Hereinafter, it will be described what are advantages of the liquid crystal display device 100 of this embodiment over its counterpart as a comparative example.

Figure 5:
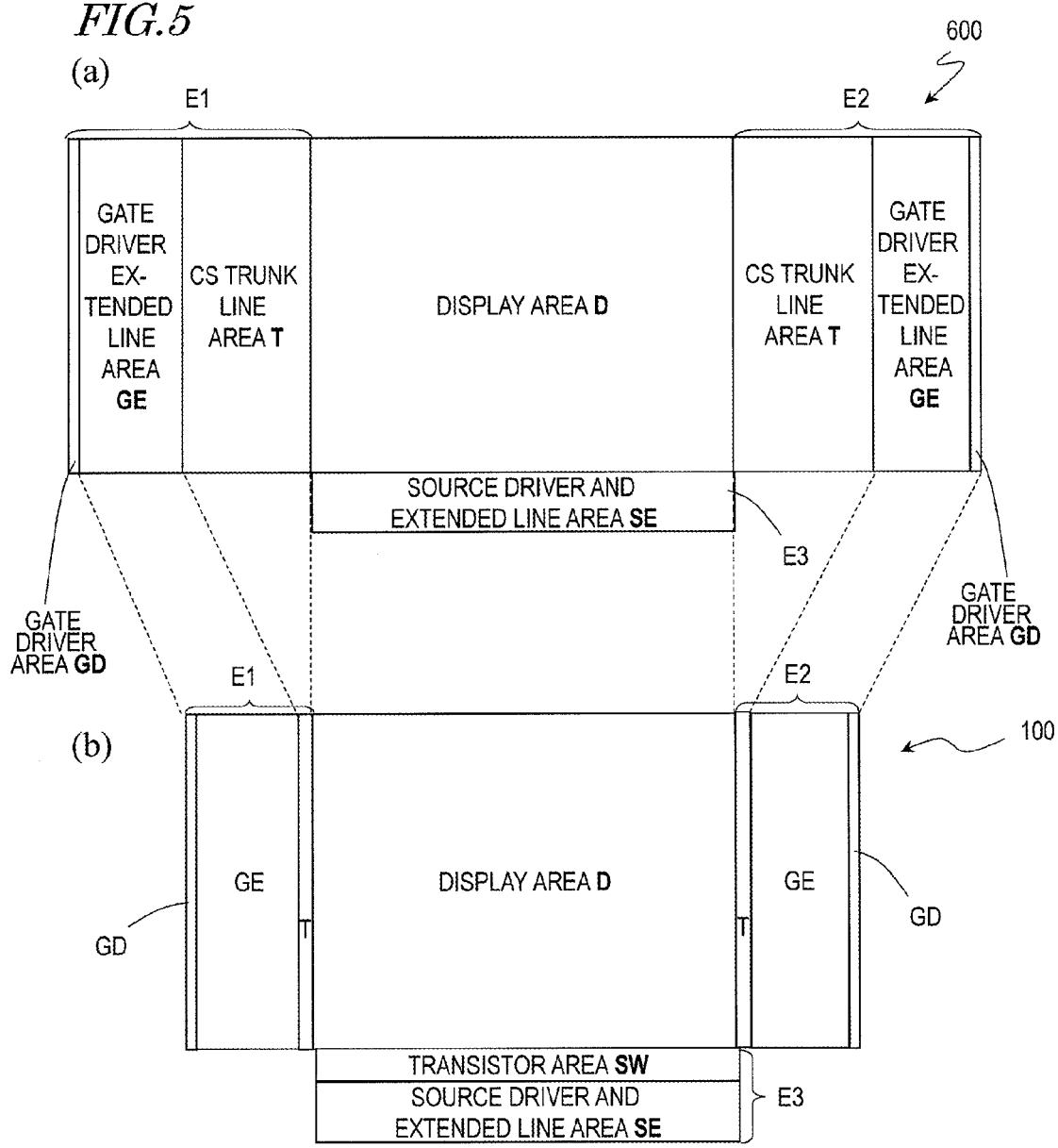
FIG. 5 (a) and FIG. 5 (b) are schematic representations illustrating a liquid crystal display device as a comparative example and the liquid crystal display device shown in FIG. 1, respectively.

FIG. 5 (a) is a schematic representation of a liquid crystal display device 600 as a comparative example. In this liquid crystal display device 600, peripheral areas E1 and E2 are arranged on the left- and right-hand sides of the display area D, respectively, and a third peripheral area E3 is arranged under the display area D. In each of the peripheral areas E1 and E2, a CS trunk line area T is arranged outside of the display area D and has twelve CS trunk lines, and a gate driver extended line area GE with a gate driver extended line is arranged outside of the CS trunk line area T. Also, a flexible substrate, to which an integrated circuit (IC) is connected, is arranged in a gate driver area GD that is located outside of the gate driver extended line area GE. Meanwhile, in the peripheral area E3, arranged is a source driver and extended line area SE.

FIG. 5 (b) is a schematic representation of the liquid crystal display device 100 of this embodiment. In this liquid crystal display device 100, peripheral areas E1 and E2 are also arranged on the left- and right-hand sides of the display area D, respectively, and a third peripheral area E3 is also arranged under the display area D. In each of the peripheral areas E1 and E2, a CS trunk line area T is arranged outside of the display area D but has only one CS trunk line, and a gate driver extended line area GE with a gate driver extended line is arranged outside of the CS trunk line area T. Also, a flexible substrate, to which an integrated circuit (IC) is connected, is arranged in a gate driver area GD that is located outside of the gate driver extended line area GE. Meanwhile, in the peripheral area E3 of this liquid crystal display device 100, arranged are not only a source driver and extended line area SE but also a transistor area SW with TFTs 180a and 180b, which is located between the source driver and extended line area SE and the display area D.

Now, let us pay attention to the lengths of the respective peripheral areas E1 of the 52 inch liquid crystal display device 600 representing the comparative example and the liquid crystal display device 100 of this embodiment. In the liquid crystal display device 600, the length of the CS trunk line area T is substantially equal to the combined length of the gate driver extended line area GE and the gate driver area GD. On the other hand, in the liquid crystal display device 100, the combined length of the gate driver extended line area GE and the gate driver area GD is almost no different from in the liquid crystal display device 600, but the peripheral area E1 of the liquid crystal display device 100 is approximately a half as long as that of the liquid crystal display device 600 because the CS trunk line area T is very short in this device 100.

It should be noted that as this liquid crystal display device 100 has the additional TFTs 180a and 180b, its peripheral area E3 becomes longer than that of the liquid crystal display device 600 as the comparative example. Nevertheless, the sum of the planar areas of the peripheral areas E1, E2 and E3 of this liquid crystal display device 100 can still be smaller than in the liquid crystal display device 600. As a result, this liquid crystal display device 100 can have a narrower frame area than the liquid crystal display device 600.

Also, since the liquid crystal display device 100 has a relatively long peripheral area E3, the source signal tends to be delayed more easily in the liquid crystal display device 100 than in the liquid crystal display device 600. To avoid such a signal delay, it is preferred that the semiconductor layer of the TFTs 180a and 180b have relatively high carrier mobility. For example, the active-matrix substrate 120 preferably has either a microcrystalline semiconductor layer or an oxide semiconductor layer as its semiconductor layer. The oxide semiconductor layer may be made of indium gallium zinc oxide (IGZO), for example.

In the embodiment described above, the threshold voltage of the TFT 180b is supposed to be greater than that of the TFT 180a. However, the present invention is in no way limited to that specific embodiment. Alternatively, the threshold voltage of the TFT 180a may be greater than that of the TFT 180b.

Also, in the embodiment described above, each of the TFTs 180a and 180b has its gate electrically connected to its source. However, this is just an example of the present invention. Alternatively, each of the TFTs 180a and 180b may have its gate electrically connected to a separately provided common line and may be turned ON at a predetermined timing.

Furthermore, in the embodiment described above, the source signal is supposed to be output from the source driver 220 to the TFTs 180a and 180b by way of the connector line 225x and the branch lines 225a and 225b, and the number of the output terminals of the source driver 220 is supposed to be almost equal to that of the columns of pixels. However, the present invention is in no way limited to that specific embodiment. Alternatively, with the connector line 225x omitted, the output terminals of the source driver 220 may be directly connected to the branch lines 225a and 225b and the number of the output terminals of the source driver 220 may be larger than that of the columns of pixels. In that case, even if the source signals supplied through two adjacent output terminals of the source driver 220 are equivalent to each other, those source signals are also sent to the TFTs 180a and 180b by way of the branch lines 225a and 225b, thereby realizing subpixels SPa and SPb that have a predetermined luminance. Consequently, a relatively inexpensive driver may be used as the source driver 220.

Embodiment 2

In the embodiment described above, substantially the same voltage is supposed to be applied to the respective gates of the two source transistors. However, this is just an example of the present invention.

Figure 6:
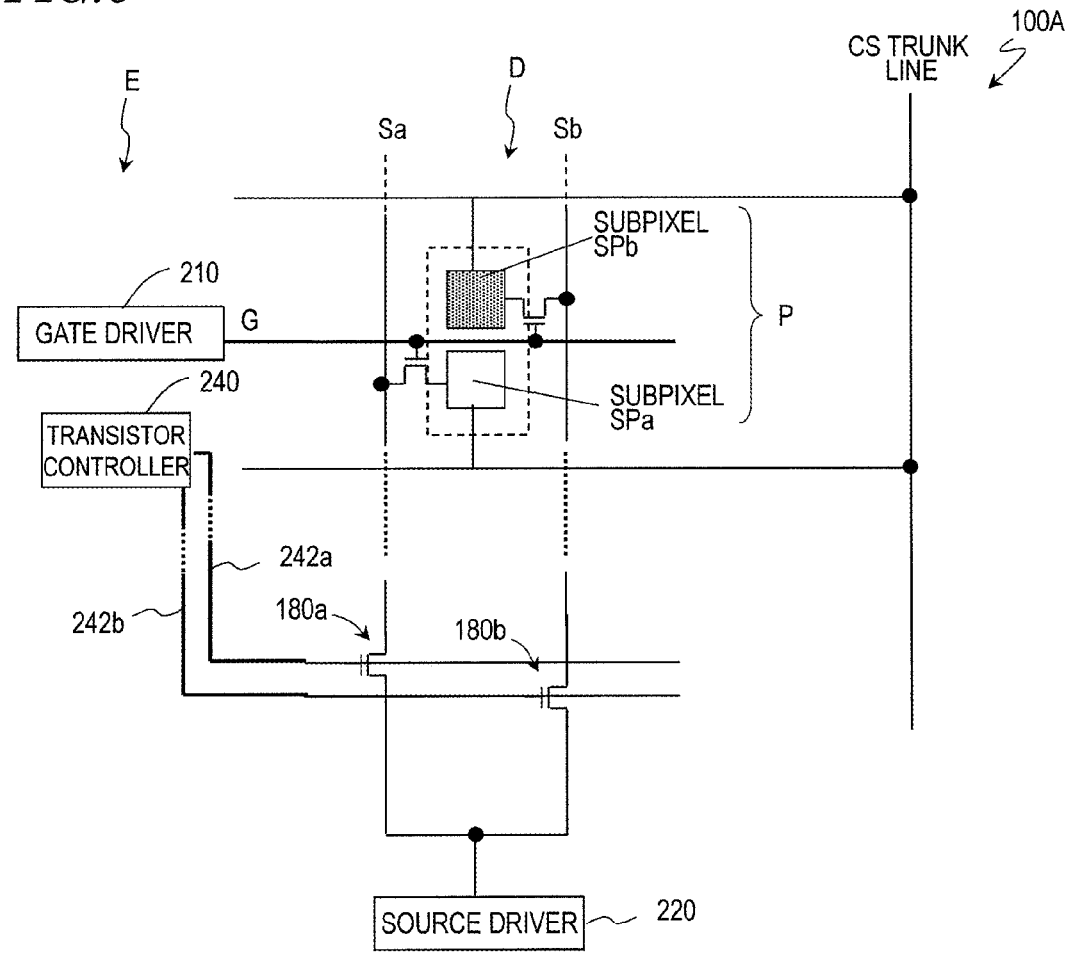
FIG. 6 is a plan view schematically illustrating a liquid crystal display device as a second embodiment of the present invention.

Hereinafter, a second specific embodiment of a liquid crystal display device according to the present invention will be described with reference to FIG. 6. The liquid crystal display device 100A of this second embodiment has the same configuration as its counterpart of the first embodiment described above except that the device 100A further includes a transistor controller that controls the transistors 180a and 180b. Thus, description of their common features will be omitted herein to avoid redundancies. Also, although a huge number of pixels P are actually arranged in the display area D, only one of them is illustrated in FIG. 6.

In this liquid crystal display device 100A, the TFTs 180a and 180b are also arranged in the peripheral area E. Although the TFTs 180a and 180b have mutually different threshold voltages in the liquid crystal display device 100 described above, the characteristics (such as the threshold voltages) of the TFTs 180a and 180b are substantially equal to each other in the liquid crystal display device 100A of this embodiment. In the following description, the threshold voltage of the TFTs 180a and 180b will be identified herein by Vtc.

The liquid crystal display device 100A includes a transistor controller 240 that controls the transistors 180a and 180b. In the following description, the transistor controller will sometimes be simply referred to herein as a "controller". The controller 240 is electrically connected to the respective gates of the TFTs 180a and 180b through lines 242a and 242b, respectively. Typically, the controller 240 is arranged in the peripheral area E of the active-matrix substrate 120.

The controller 240 controls the TFTs 180a and 180b so that their ON-state periods are different from each other. As a result, when the gate line G is in OFF state, the voltages on the source lines Sa and Sb will be different from each other, and therefore, the subpixels SPa and SPb can have mutually different luminances. For example, if the TFT 180a has a longer ON-state period than the TFT 180b, the absolute value of the voltage of the subpixel electrode 124a is greater than that of the voltage of the subpixel electrode 124b when the TFTs 130a and 130b are in OFF state.

Optionally, the controller 240 and the gate driver 210 may apply either different voltages synchronously with each other or the same voltage. That is why the controller 240 and the gate driver 210 may be formed by performing the same series of process steps, and there is no need to perform any additional process step to form the controller 240 alone. Still alternatively, the gate driver 210 may also function as the controller 240. And every gate output terminal of the gate driver 210 may be electrically connected to the lines 242a and 242b.

Figure 7:
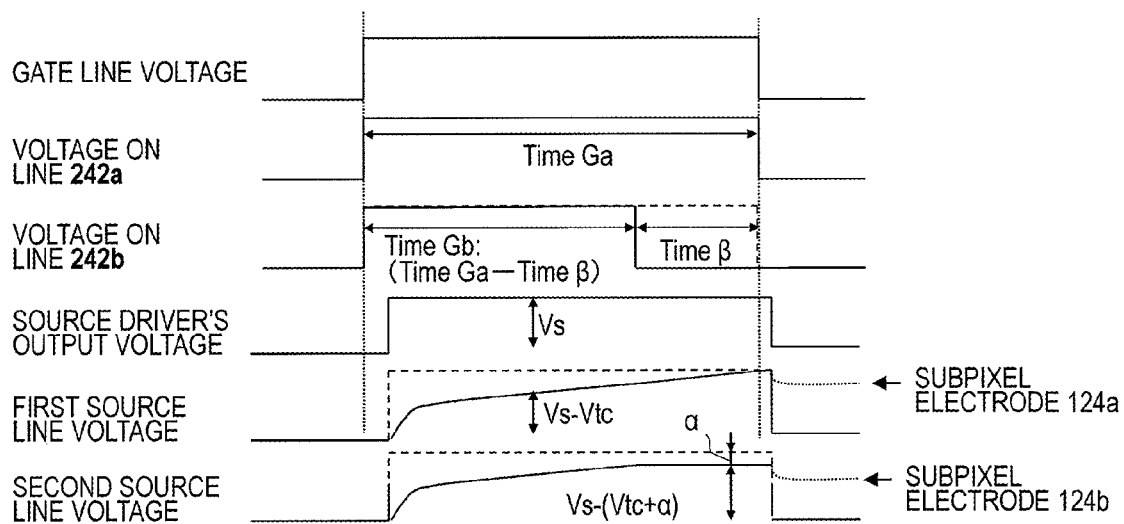
FIG. 7 shows the respective waveforms of the voltages applied in the liquid crystal display device shown in FIG. 6.

Hereinafter, it will be described with reference to FIGS. 6 and 7 how to drive the liquid crystal display device 100A. In the following example, a voltage is supposed to be written on a pixel P. In the liquid crystal display device 100A, the ON-state period of the TFT 180b is different from (e.g., shorter than) that of the TFT 180a. In the following description, the ON-state periods of the TFTs 180a and 180b will be identified by Time Ga and Time Gb, respectively, and Time Ga=Time Gb+Time β (where Time β>0).

First of all, in order to select a pixel P, the voltage on the gate line G is raised from the low level to the high level, thereby turning the TFTs 130a and 130b ON. At the same time, when the voltage on the gate line G is raised, the voltages on the lines 242a and 242b are also raised from the low level to the high level, thereby turning the TFTs 180a and 180b ON.

Next, the output voltage of the source driver 220 is changed into a voltage Vs corresponding to the grayscale level of the pixel P. As a result, the voltages on the source lines Sa and Sb start to change. In FIG. 7, in order to charge the liquid crystal capacitors and storage capacitors of the subpixels SPa and SPb fully, the voltages on the source lines SPa and SPb change with time since the voltage of the source driver 220 has changed. In this liquid crystal display device 100A, the voltages on the lines 242a and 242b to turn the TFTs 180a and 180b ON are equal to each other, so are the threshold voltages of the TFTs 180a and 180b. That is why the voltages on the branch lines 225a and 225b are equal to each other, and the voltages on the source lines Sa and Sb to be transmitted by way of the TFTs 180a and 180b change to substantially the same degree.

Thereafter, when the ON-state period Time Gb passes, the controller 240 changes the voltage on the line 242b into the low level earlier, thereby turning the TFT 180b OFF. In this ON-state period Time Gb, the voltages on the source lines Sa and Sb are changing with time.

Next, when a time Time β passes since then, the controller 240 changes the voltage on the line 242a into the low level, thereby turning the TFT 180a OFF. By this point in time, the voltage on the source line Sa has already reached a predetermined value. The voltage decrease caused by the TFT 180a is substantially equal to the threshold voltage Vtc of the TFT 180a, and therefore, a voltage Vs-Vtc is applied to the source line Sa. Supposing the variation in the voltage on the source line Sa after the TFT 180b has been turned OFF and until the TFT 180a is turned OFF is identified by α, a voltage Vs-(Vtc+α) is applied onto the source line Sb. In FIG. 7, the output voltage of the source driver and the voltages on the first and second source lines Sa and Sb are shown with respect to the voltage of the counter electrode 144, and the subpixels SPa and SPb become a bright subpixel and a dark subpixel, respectively.

In this case, the controller 240 makes the brightness levels of the subpixels SPa and SPb different from each other in not only the pixel P at the row m, column n position but also the pixel P at the row m, column n+1 position as well. For example, if in the pixel P located at the row m, column n position, the voltages of the subpixel electrodes 124a and 124b with respect to the voltage of the counter electrode 144 are +6 V and +4 V, respectively, then the effective voltages applied to the subpixels SPa and SPb are 6 V and 4 V, respectively, thus making the subpixels SPa and SPb a bright subpixel and a dark subpixel, respectively. On the other hand, if in the pixel P located at the row m, column n+1 position, the voltages of the subpixel electrodes 124a and 124b with respect to the voltage of the counter electrode 144 are −4 V and −6 V, respectively, then the effective voltages applied to the subpixels SPa and SPb are 4 V and 6 V, respectively, thus making the subpixels SPa and SPb a dark subpixel and a bright subpixel, respectively.

Also, in a situation where the input video signal indicates that a pixel should maintain the same grayscale level all through a number of vertical scanning periods that are defined by the liquid crystal display device 100A, if the voltages of the subpixel electrodes 124a and 124b of a pixel P are greater than the voltage of the counter electrode 144 in one vertical scanning period, then the former voltages may be smaller than the latter voltage in the next vertical scanning period. For example, one vertical scanning period in which a positive voltage has been written is followed by another vertical scanning period in which a negative voltage is written.

For example, if the voltages of the subpixel electrodes 124a and 124b are +6 V and +4V, respectively, with respect to the voltage of the counter electrode 144, the effective voltages applied to the subpixels SPa and SPb are 6 V and 4 V and the subpixels SPa and SPb become a bright subpixel and a dark subpixel, respectively. On the other hand, if in another (typically, the next) vertical scanning period, the voltages of the subpixel electrodes 124a and 124b are −4 V and −6 V, respectively, with respect to the voltage of the counter electrode 144, the effective voltages applied to the subpixels SPa and SPb are 4 V and 6 V, and the subpixels SPa and SPb become a dark subpixel and a bright subpixel, respectively.

In the liquid crystal display device 100A of the embodiment described above, the TFTs 180a and 180b are supposed to have the same characteristic. However, the present invention is in no way limited to that specific embodiment. Alternatively, the TFTs 180a and 180b may have mutually different characteristics. For example, the threshold voltage of the TFT 180b may be smaller than that of the TFT 180a. In that case, even if the difference between their ON-state periods is relatively small, the difference in luminance between the subpixels SPa and SPb can still be the expected value.

In the embodiment described above, the ON-state period of the TFT 180b is supposed to overlap with that of the TFT 180a. However, this is just an example of the present invention. The ON-state period of the TFT 180b does not have to overlap with that of the TFT 180a. Nevertheless, if the ON-state period of the TFT 180b does overlap with that of the TFT 180a, the subpixel electrodes 124a and 124b can be charged efficiently.

Embodiment 3

In the embodiments described above, the voltages on the source lines are made different from each other by taking advantage of the difference between the ON-state periods of the source transistors. However, the present invention is in no way limited to those specific embodiments.

Figure 8:
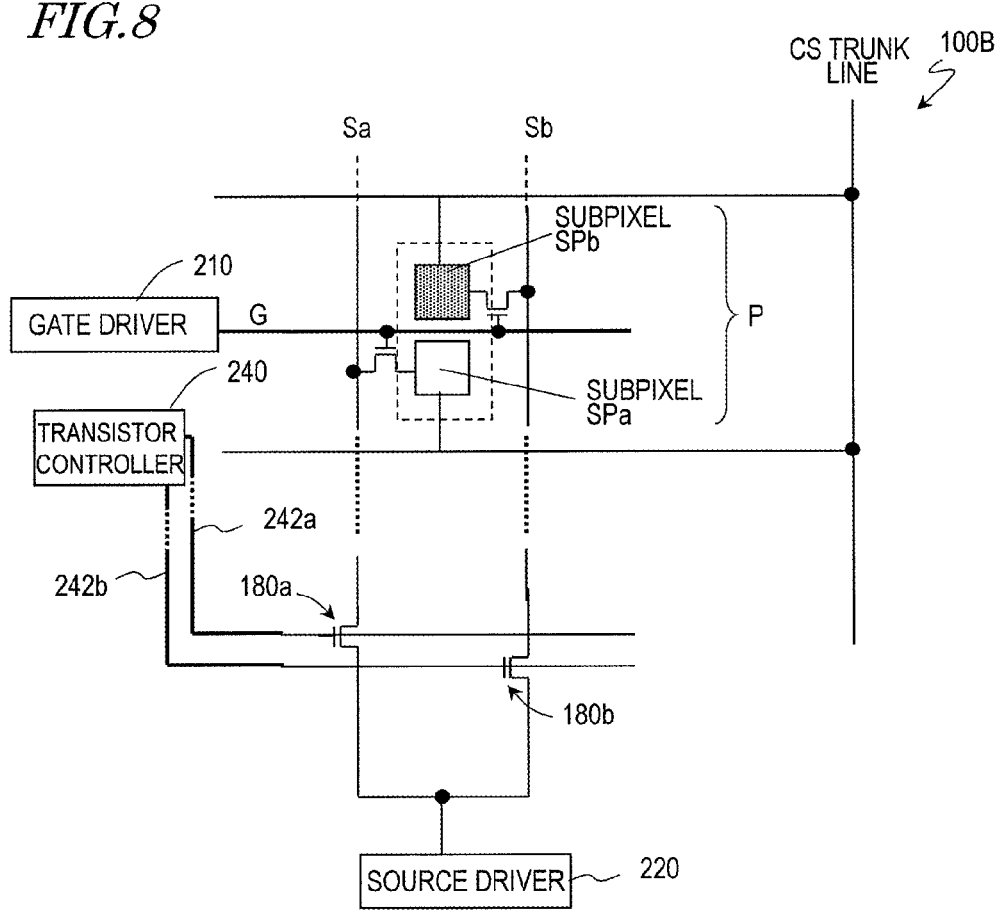
FIG. 8 is a plan view schematically illustrating a liquid crystal display device as a third embodiment of the present invention.

Hereinafter, a third embodiment of a liquid crystal display device according to the present invention will be described with reference to FIG. 8. The liquid crystal display device 100B of this embodiment has the same configuration as its counterpart of the second embodiment described above except that the voltage applied by the source driver 220 turns the TFTs 180a and 180b ON at different points in time. Thus, description of their common features will be omitted herein to avoid redundancies.

In this liquid crystal display device 100B, the TFTs 180a and 180b are also arranged in the peripheral area E. Although the TFTs 180a and 180b have mutually different threshold voltages in the liquid crystal display device 100 described above, the threshold voltages of the TFTs 180a and 180b may be substantially equal to each other in the liquid crystal display device 100B of this embodiment. Also, just like the liquid crystal display device 100A described above, the liquid crystal display device 100B of this embodiment also has the transistor controller 240 that controls the transistors 180a and 180b.

In this liquid crystal display device 100B, the gate driver 210 turns the TFTs 130a and 130b ON to change the output voltage of the source driver 220 into a voltage corresponding to a predetermined grayscale level. Then, first of all, the controller 240 raises the voltage on the line 242a to the high level, thereby turning the TFT 180a ON. When the subpixel electrode 124a is charged to a predetermined voltage level through the source line Sa, the controller 240 changes the voltage on the line 242a into the low level, thereby turning the TFT 180a OFF.

Next, with the voltage on the gate line G kept high, the voltage of the source driver 220 changes into a voltage corresponding to the predetermined grayscale level. After that, the controller 240 raises the voltage on the line 242a to the high level, thereby turning the TFT 180b ON. When the subpixel electrode 124b is charged to a predetermined voltage level through the source line Sb, the controller 240 changes the voltage on the line 242b to the low level, thereby turning the TFT 180b OFF.

Figure 9:
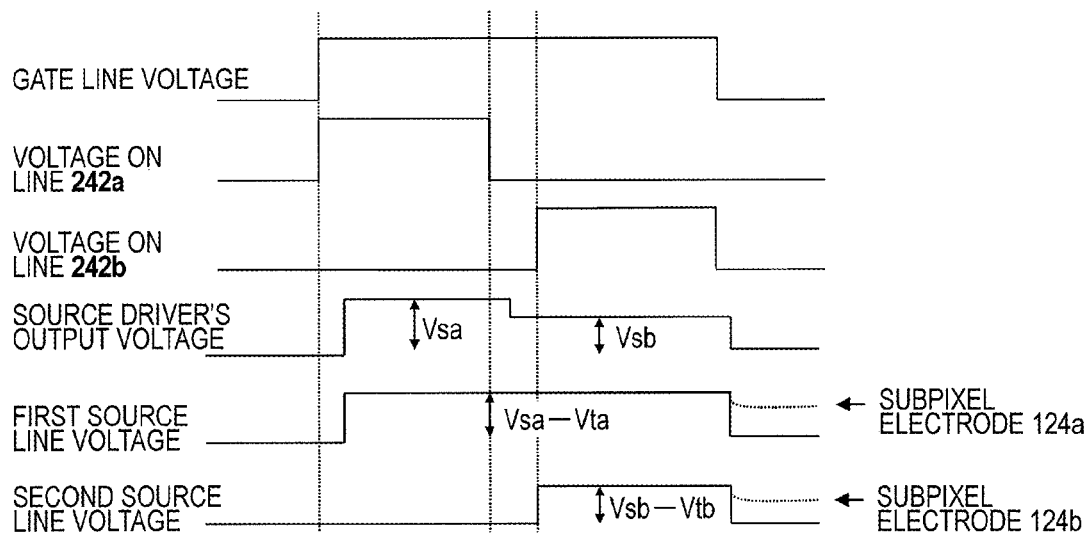
FIG. 9 shows the respective waveforms of the voltages applied in the liquid crystal display device shown in FIG. 8.
Figure 10:
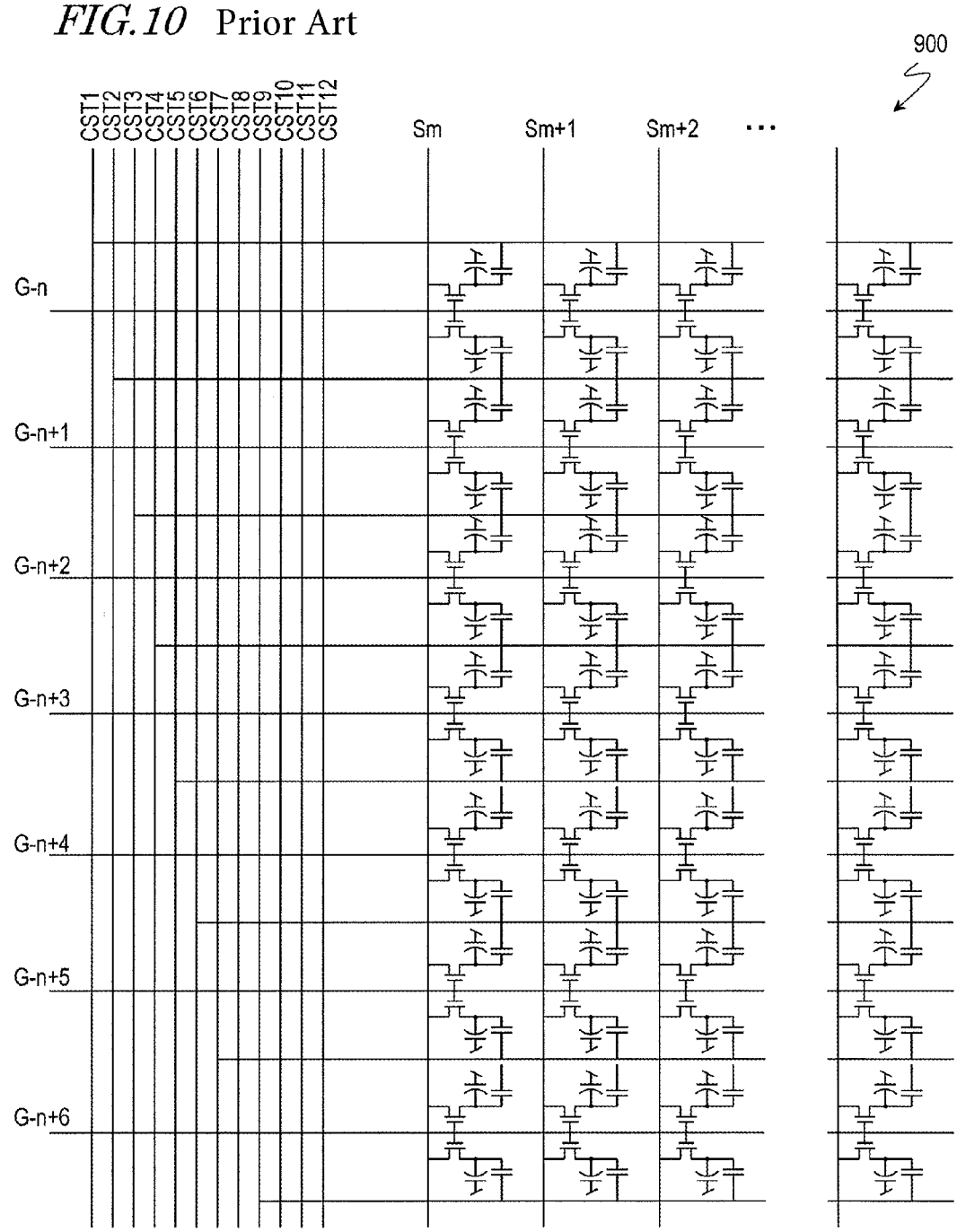
FIG. 10 is a schematic representation illustrating a conventional liquid crystal display device.

Hereinafter, it will be described with reference to FIGS. 8 and 9 how to drive this liquid crystal display device 100B. In the following example, a voltage is supposed to be written on a pixel P.

First of all, in order to select a pixel P, the voltage on the gate line G is raised from the low level to the high level, thereby turning the TFTs 130a and 130b ON. At the same time, when the voltage on the gate line G is raised, the voltage on the line 242a is also raised from the low level to the high level, thereby turning the TFT 180a ON.

Next, the output voltage of the source driver 220 is changed into a voltage Vsa corresponding to the grayscale level of the pixel P. Specifically, the voltage Vsa corresponds to the grayscale level of the bright subpixel of the pixel P. As a result, the voltage on the source line Sa starts to change. As the voltage decrease caused by the TFT 180a is substantially equal to the threshold voltage Vta, a voltage Vsa-Vta is applied onto the source line Sa. Actually, however, it takes a predetermined amount of time to get the liquid crystal capacitor and storage capacitor of the subpixel SPa charged fully. And the voltage on the source line Sa gradually changes with time toward a constant voltage after the voltage of the source driver 220 has changed. In FIG. 9, however, the voltage on the source line Sa is supposed to change when the voltage of the source driver 220 changes, in order to avoid complicating the illustration too much.

Thereafter, the controller 240 changes the voltage on the line 242a associated with the TFT 180a into the low level, thereby turning the TFT 180a OFF. Meanwhile, the voltage on the gate line G stays high.

Next, the output voltage of the source driver 220 is changed into a voltage corresponding to the grayscale level of the subpixel SPb. Specifically, the voltage Vsb corresponds to the grayscale level of the bright subpixel of the pixel P. Thereafter, the voltage on the line 242b to select the TFT 180b is raised from the low level to the high level, thereby turning the TFT 180b ON. As a result, the voltage on the source line Sb starts to change. As the voltage decrease caused by the TFT 180b is substantially equal to the threshold voltage Vtb, a voltage Vsb-Vtb is applied onto the source line Sb. If the threshold voltages of the TFTs 180a and 180b are equal to each other and are both represented by Vtc, a voltage Vs-Vtc is applied onto the source line Sa. Also, if the variation in the voltages Vsa and Vsb of the source driver 220 is identified by α, a voltage Vs-(Vtc+α) is applied onto the source line Sb.

In this manner, the controller 240 turns the TFTs 180a and 180b ON at respective points in time when the output voltages of the source driver 220 are different from each other, thereby making the luminance of the subpixel SPa different from that of the subpixel SPb.

In the liquid crystal display device 100B, the controller 240 and the gate driver 210 may apply either different voltages synchronously with each other or the same voltage. That is why the controller 240 and the gate driver 210 may be formed by performing the same series of process steps, and there is no need to perform any additional process step to form the controller 240 alone.

In the liquid crystal display device 100B of the embodiment described above, the TFTs 180a and 180b are supposed to have the same characteristic. However, the present invention is in no way limited to that specific embodiment. Alternatively, the TFTs 180a and 180b may have mutually different characteristics. For example, the threshold voltage of the TFT 180b may be smaller than that of the TFT 180a.

Furthermore, in the embodiments described above, each pixel is supposed to have two subpixels. However, this is just an example of the present invention. Optionally, each pixel may have three or more subpixels as well. For example, each pixel electrode 124 may include three or more subpixel electrodes and three or more source lines and three or more source transistors may be provided for each column of pixels.

Industrial Applicability

The present invention provides a liquid crystal display device that can not only minimize an increase in driver cost but also reduce the planar-area of the frame area sufficiently.

REFERENCE SIGNS LIST 100 liquid crystal display device
120 active-matrix substrate
124 pixel electrode
124a first subpixel electrode
124b second subpixel electrode
126 alignment film
130a first pixel transistor
130b second pixel transistor
140 counter substrate
144 counter electrode
146 alignment film
160 liquid crystal layer
180a first source transistor
180b second source transistor
210 gate driver
220 source driver
240 transistor controller

The invention claimed is:
1. A liquid crystal display device comprising:
a pixel electrode, which includes first and second subpixel electrodes;
a counter electrode;
a liquid crystal layer, which is interposed between the pixel electrode and the counter electrode;
a gate line;
a first source line;
a second source line;
a first pixel transistor, which includes a gate that is electrically connected to the gate line, a source that is electrically connected to the first source line, and a drain that is electrically connected to the first subpixel electrode;
a second pixel transistor, which includes a gate that is electrically connected to the gate line, a source that is electrically connected to the second source line, and a drain that is electrically connected to the second subpixel electrode;

a gate driver, which supplies a gate signal to the gate line;

a first branch line;

a second branch line;

a source driver, which supplies a source signal to the first and second branch lines;

a first source transistor, which includes a gate, a source that is electrically connected to the first branch line, and a drain that is electrically connected to the first source line, wherein the gate of the first source transistor is electrically connected to the source of the first source transistor; and a second source transistor, which includes a gate, a source that is electrically connected to the second branch line, and a drain that is electrically connected to the second source line, wherein the gate of the second source transistor is electrically connected to the source of the second source transistor.

2. The liquid crystal display device of claim 1, further comprising a connector line that electrically connects the first and second branch lines to the source driver.

3. The liquid crystal display device of claim 1, wherein the second source transistor has a different threshold voltage from the first source transistor.

4. The liquid crystal display device of claim 1, further comprising a transistor controller that controls the first and second source transistors.

5. The liquid crystal display device of claim 4, wherein the transistor controller controls the first and second source transistors so that the ON-state periods of the first and second source transistors are different from each other.

6. The liquid crystal display device of claim 4, wherein while the gate driver keeps the first and second pixel transistors ON, the source driver changes the levels of the voltage applied to the first and second branch lines from a first voltage into a second voltage, and wherein while the source driver is applying the first voltage, the transistor controller turns the first source transistor ON, and wherein while the source driver is applying the second voltage, the transistor controller turns the second source transistor ON.

* * * * *